United States Patent [11] 3,630,671

[72] Inventor Michael J. Block
Fullerton, Calif.
[21] Appl. No. 846,937
[22] Filed Aug. 1, 1969
[45] Patented Dec. 28, 1971
[73] Assignee Union Oil Company of California
Los Angeles, Calif.

[54] OXIDATION OF HYDROGEN CYANIDE TO CYANOGEN IN A LIQUID MEDIUM UTILIZING A GROUP VIII NOBLE METAL CATALYST IN COMPLEX ASSOCIATION WITH A BIPHYLLIC LIGAND
11 Claims, No Drawings

[52] U.S. Cl. .................................................. 23/151,
252/431 P, 252/431 R
[51] Int. Cl. ............................................. C01c 3/00,
B01j 11/00
[50] Field of Search ........................................... 23/151

[56] References Cited
UNITED STATES PATENTS
3,494,734   2/1970   Nakamura ..................   23/151
FOREIGN PATENTS
1,163,302   2/1964   Germany .....................   23/151

*Primary Examiner*—Oscar R. Vertiz
*Assistant Examiner*—Hoke S. Miller
*Attorneys*—Milton W. Lee, Richard C. Hartman, Lannas S. Henderson, Dean Sandford and Robert E. Strauss

ABSTRACT: Hydrogen cyanide is oxidized to cyanogen by contacting hydrogen cyanide and oxygen with a substantially anhydrous liquid medium containing a Group VIII noble metal, preferably in complex with a biphyllic ligand at a temperature between 20° and 300° C. and at a pressure sufficient to maintain liquid phase conditions. A preferred embodiment is contacting hydrogen cyanide and oxygen with a carboxylic acid containing a complex of rhodium chloride and triphenylphosphine at a temperature between 20° and 150° C. The process is advantageous in that use of an inorganic nitrogen oxide promoter is not required.

OXIDATION OF HYDROGEN CYANIDE TO CYANOGEN IN A LIQUID MEDIUM UTILIZING A GROUP VIII NOBLE METAL CATALYST IN COMPLEX ASSOCIATION WITH A BIPHYLLIC LIGAND

DESCRIPTION OF THE INVENTION

The invention relates to the oxidation of hydrogen cyanide to cyanogen. In particular the invention relates to the oxidation of hydrogen cyanide to cyanogen in a liquid phase process conducted in the absence of an inorganic nitrogen oxide, e.g., nitric acid or nitrogen dioxide.

Various methods of producing cyanogen from hydrogen cyanide have been proposed. The vapor phase oxidation of hydrogen cyanide to cyanogen has been attempted with air over cobalt, palladium or platinum catalysts and with nitrogen dioxide over magnesium or calcium catalysts. These processes have achieved only low selectivities or have consumed stoichiometric quantities of nitrogen dioxide, an expensive oxidant. Attempts to provide simultaneous regeneration of the nitrogen dioxide in the vapor phase have been complicated by the necessity to remove water vapor from the gaseous products and reactants. Liquid phase oxidation with cupric oxide in an aqueous reaction medium has also been attempted, however, the recovery of copper and its regeneration to cupric oxide has involved complex process steps. Another attempt has combined a copper oxidant with nitrogen dioxide, again resulting in consumption of a stoichiometric quantity of nitrogen dioxide.

An object of the invention is to improve the production of cyanogen from hydrogen cyanide.

Another object of the invention is to produce cyanogen from hydrogen cyanide without requiring the addition of nitrogen dioxide promoter.

Another object of the invention is to provide an efficient and relatively uncomplicated process for the production of cyanogen from hydrogen cyanide in a liquid phase medium.

A still further object of the invention is to increase the selectivity yields and conversion of hydrogen cyanide to cyanogen.

Other related objects will be apparent from the description of the invention to follow.

According to the invention, hydrogen cyanide is oxidized to cyanogen by contacting hydrogen cyanide and oxygen with a liquid medium containing a Group VIII noble metal, preferably in complex with a biphyllic ligand, to be fully described hereinafter, at a temperature between 20° and 300° C., preferably between 20° and 150° C. The reaction proceeds according to the following equation:

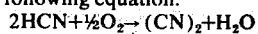

$$2HCN + \tfrac{1}{2}O_2 \rightarrow (CN)_2 + H_2O$$

A part of the hydrogen cyanide is oxidized to carbon dioxide and represents a production of a wasteful byproduct, however, as will be seen from the examples, the amount of carbon dioxide produced is minimal and the selectivity to cyanogen is high.

An advantage of the process of the invention is that the addition of an inorganic nitrogen oxide promoter, e.g., nitrogen dioxide, nitric acid, a nitrate salt such as an alkali metal or alkaline earth metal nitrate, or a Group Ib or IIb nitrate, is not required for high selectivity and/or conversion. A promoter, of course, may be utilized if desired.

The catalyst of the invention comprises a Group VIII noble metal and is preferably in complex association with a biphyllic ligand to be described. The Group VIII noble metal may be ruthenium, rhodium, palladium, osmium, iridium or platinum. Preferred metals are rhodium and ruthenium, most preferably rhodium due to its greater activity. A catalytic quantity of the metal is added (e.g., 0.002–2 percent of the reaction medium) and the metal may be added as a soluble salt, a carbonyl, a hydride or as a chelate.

Examples of suitable sources of the noble metals are as follows: iridium carbonyl chloride, iridium carbonyl hydride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaamminorhodium(III) chloride, rhodium dicarbonyl chloride dimer, rhodium nitrate, rhodium trichloride, rhodium carbonyl hydride, ruthenium trichloride, tetraamminorutheniumhydroxychloro chloride; etc. Generally the halide salts and, particularly, the chloride salts are preferred sources of the Group VII noble metal, e.g., rhodium chloride.

A biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about three carbons and containing arsenic, antimony, phosphorus, or bismuth in a trivalent state. Of these the phosphorus compounds, i.e., the phosphines, are preferred; however, the arsines, stibines and bismuthines can also be employed. In general these biphyllic ligands have the following structure:

$$E(R)_3$$

wherein E is trivalent phosphorus, arsenic, antimony or bismuth; and wherein R is the same or different alkyl having one to 12 carbons; cycloalkyl, alkylcycloalkyl, cycloalkylalkyl having four to 12 carbons; or aryl or alkaryl having six to 12 carbons. Examples of such R groups are methyl, butyl, nonyl, cyclohexyl, cyclodecyl, phenyl, tolyl, xylyl, duryl, etc. Preferably at least one R is aryl or alkaryl, e.g., phenyl, tolyl, xylyl, etc., and biphyllic ligands comprising two aryl or alkaryl groups and, particularly, those comprising three aryl or alkaryl groups are most preferred.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphosphine, tricumenylphosphine, trixylylbismuthine, etc. Of the aforementioned, the aryl phosphines and particularly the triarylphosphines or trialkarylphosphines (e.g., triphenylphosphine) are preferred because of their greater activity.

The group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess, e.g., 10–300 percent, of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc. may be, but need not be, included in the complex catalyst of this invention. These components may be incorporated in the catalyst by the formation of the catalyst complex from a Group VIII noble metal salt of the indicated anions. A preferred complex is one comprising at least one halide ligand, e.g., chloride, iodide or bromide, or at least one $C_1$–$C_5$ carboxylate, e.g., acetate, propionate, butyrate, etc., since these groups, particularly halide, have been shown to improve the activity of the catalyst.

The source of oxygen necessary for the reaction may be air, pure oxygen, a mixture of nitrogen and oxygen or any other oxygen-containing gas whose other component(s) are inert to the hydrogen cyanide, cyanogen and the reaction medium. It is preferred that an excess, e.g., 2-100 times the stoichiometric amount required to oxidize hydrogen cyanide, of oxygen be present.

The reaction medium may be any organic liquid which has a solvency for the catalyst and for hydrogen cyanide. Suitable media include the carboxylic acids having two to 25 carbons such as aromatic carboxylic acid, e.g., benzoic, toluic, phthalic, naphthoic acids and the fatty acids, e.g., pivalic, caproic, capric, acetic, butyric, lauric and stearic acids. Anhydrides of these acids, stearic anhydride, acetic anhydride, etc. and ketones, esters and amides may also be utilized. Examples of such are dimethylketone, methylpropylketone, ethylpropylketone, diheptylketone, cyclohexanone, methylpropionate, ethyl acetate, propyl formate, butyramide, diacetamide, etc. Preferably the reaction medium is a fatty acid, preferably a lower $C_2$-$C_5$ acid, e.g., acetic acid. It is also preferred that the reaction medium be substantially anhydrous, e.g., containing less than 20 volume percent, preferably less than 10 volume percent water. The water may be removed from the reaction medium by the withdrawal of part of the reaction medium, separation of the water by distillation and recycling of the anhydrous reaction medium to the reactor or by the addition of suitable dehydration agents to the reaction medium such as the aforementioned acid anhydrides.

The reaction may be conducted at relatively mild conditions, e.g., 20°-300° C. preferably 20°-150° C., and in some cases as low as 20°-95° C. The process has the advantage that it may be conducted at low temperatures and hence oxidation of hydrogen cyanide to the wasteful byproduct carbon dioxide is minimized. Furthermore, since the reaction may be conducted at low temperatures, the pressure necessary to maintain liquid phase may be relatively low, e.g., 1-8 atmospheres, preferably 1-5 atmospheres. Higher pressures e.g., 8-100 atmospheres, of course, may be utilized.

The process may be conducted in a batch or in a continuous process, however, it is preferred that the process be continuous. The reaction medium, catalyst and biphyllic ligand can be introduced into a low-pressure reactor. Hydrogen cyanide and air can be continuously passed into the reactor to contact the reaction medium. The effluent gases are continuously taken overhead, cooled, transferred to a separator where water and other condensibles such as the reaction medium are separated. The uncondensibles containing chiefly a carbon dioxide, nitric oxide, hydrogen cyanide and cyanogen are taken overhead and subjected to a washing operation to separate cyanogen and hydrogen cyanide. The overhead from the washing operation may be flared or, depending on the economics, the desired byproduct gases such as carbon dioxide can be recovered from the gas stream. The aqueous mixture of hydrogen cyanide and cyanogen is taken from the bottom of the washing column and transferred to a distillation column where cyanogen and hydrogen cyanide are distilled over, transferred to another distillation column where cyanogen is taken overhead and sent to product storage. Hydrogen cyanide is recycled to the aforementioned reactor. The condensibles from the separator just downstream of the reactor are transferred to a distillation column where cyanogen and hydrogen cyanide flow overhead, combine with the overhead from the aforementioned separator and are subjected to the above-described washing operation. The bottoms comprising water and the reaction medium are transferred to a distillation column wherein water is flashed overhead and the reaction medium which may contain entrained catalyst and biphyllic ligand is recycled to the reactor for further contacting.

The process of the invention and the results obtained thereby are demonstrated by the following example.

EXAMPLE 1

To a 500 milliliter three-necked flask were charged 250 milliliters of acetic acid and 1 gram of tris(triphenylphosphine)rhodium chloride. Air at essentially ambient temperature and atmospheric pressure was continuously passed at a rate of 52.5 liters per hour through a liquid hydrogen cyanide reservoir maintained at 0° C. to saturate the airstream with hydrogen cyanide. The saturated airstream was then passed into the 500 milliliter flask to contact acetic acid and the rhodium catalyst. The flask was heated to and maintained at about 55°-60° C. while being constantly stirred. A gaseous effluent was continuously withdrawn from the flask and a spot sample of the effluent was taken and analyzed. The effluent was found to contain 19.65 mole percent hydrogen cyanide, 0.06 percent nitric oxide, 0 percent nitrogen dioxide, 0.08 percent carbon dioxide and 3.48 percent cyanogen, the balance comprising principally oxygen, nitrogen and water.

After adjustment for the amount of carbon dioxide introduced in the feed air, the selectivity to cyanogen, based on hydrogen cyanide converted, was calculated to be 99 mole percent. The total conversion of hydrogen cyanide to all products was calculated to be 26 mole percent. The yield of cyanogen based on hydrogen cyanide charged was calculated to be 26 mole percent.

EXAMPLE 2

The above example was essentially repeated except that the reaction medium in the 500 milliliter flask was maintained at about 28° C. The effluent was found to contain 11.40 percent hydrogen cyanide, 0.03 percent nitric oxide, 0 percent nitrogen dioxide, 0.07 percent carbon dioxide and 0.39 percent cyanogen. The selectivity to cyanogen was 94 percent, the conversion 6.5 percent and the yield 6.1 percent.

Palladium, ruthenium or iridium may each be substituted in equal molar quantity for rhodium in the above examples without departing from the illustrated mode of practice.

I claim:

1. A process for the oxidation of hydrogen cyanide to cyanogen which comprises contacting hydrogen cyanide and oxygen with a substantially anhydrous liquid reaction medium containing less than 10 weight percent water and a catalytic amount of a Group VIII noble metal in complex association with a biphyllic ligand having the following structure:

$$E(R)_3$$ 

wherein E is trivalent phosphorus, arsenic, antimony or bismuth; and wherein R is the same or different alkyl having one to 12 carbons, cycloalkyl, alkylcycloalkyl, and cycloalkylalkyl having four to 12 carbons or aryl or alkaryl groups having six to 12 carbons at a temperature between 20° and 300° C. and at a pressure sufficient to maintain liquid phase reaction conditions.

2. The process of claim 1 wherein the Group VIII noble metal is rhodium or ruthenium.

3. The process of claim 1 wherein the biphyllic ligand is a triaryl or trialkaryl phosphine.

4. The process of claim 1 wherein said biphyllic ligand is present in an excess quantity from 10 to 300 percent greater than the stoichiometric amount required in complex association with said metal.

5. The process of claim 1 wherein the reaction medium is a fatty acid having one to 25 carbons.

6. The process of claim 5 wherein said reaction medium contains an anhydride acid fatty acid.

7. The process of claim 1 wherein the Group VIII noble metal is rhodium, the biphyllic ligand is triphenylphosphine, and the reaction medium is a fatty acid having one to 25 carbons.

8. The process of claim 7 wherein the reaction is conducted at a temperature between 20° and 95° C.

9. The process of claim 7 wherein said fatty acid has from two to five carbons.

10. The process of claim 1 in at least two of said R groups of said biphyllic ligands are aryl or alkaryl.

11. The process of claim 10 wherein the Group VIII noble metal is rhodium.

* * * * *